United States Patent [19]
Michels

[11] Patent Number: 6,114,946
[45] Date of Patent: Sep. 5, 2000

[54] COMBINATIONAL LOGIC FOR COMPARING N-BIT WIDE BUSES

[75] Inventor: Matthew G. Michels, Fort Collins, Colo.

[73] Assignee: LSI Logic Corporation, Milpitas, Calif.

[21] Appl. No.: 09/150,778

[22] Filed: Sep. 10, 1998

[51] Int. Cl.[7] .................................................... G06F 7/02
[52] U.S. Cl. ........................................................ 340/146.2
[58] Field of Search ......................................... 340/146.2

[56] References Cited

U.S. PATENT DOCUMENTS

| | | | |
|---|---|---|---|
| 4,748,438 | 5/1988 | Mickeal | 340/146.2 |
| 4,760,374 | 7/1988 | Moller | 340/146.2 |
| 4,884,270 | 11/1989 | Chiu et al. | 371/21.2 |
| 4,951,248 | 8/1990 | Lynch | 364/900 |
| 5,257,216 | 10/1993 | Sweedler | 340/146.2 |
| 5,444,722 | 8/1995 | Tran | 395/183.18 |
| 5,450,056 | 9/1995 | Jens | 340/146.2 |
| 5,452,257 | 9/1995 | Han | 365/230.03 |
| 5,530,837 | 6/1996 | Williams et al. | 395/434 |
| 5,586,300 | 12/1996 | Wilcox et al. | 395/477 |

*Primary Examiner*—Margaret R. Wambach

[57] ABSTRACT

A combinational logic circuit for determining whether an address is inside or outside a range at least partially defined by a control address bit. The logic circuit includes combinational logic connected to an address bit line for receiving the address bit being tested and connected to a control address bit line for receiving the control address bit at least partially defining the range. The combinational logic is configured to produce a signal indicating whether the address bit being tested and the control address bit at least partially defining the range are equal. The combinational logic is also configured to produce a signal representing a mathematical relation between the address bit being tested and the control address bit at least partially defining the range. The mathematical relation identifies whether the address bit being tested is inside or outside the range at least partially defined by the control address bit.

11 Claims, 2 Drawing Sheets

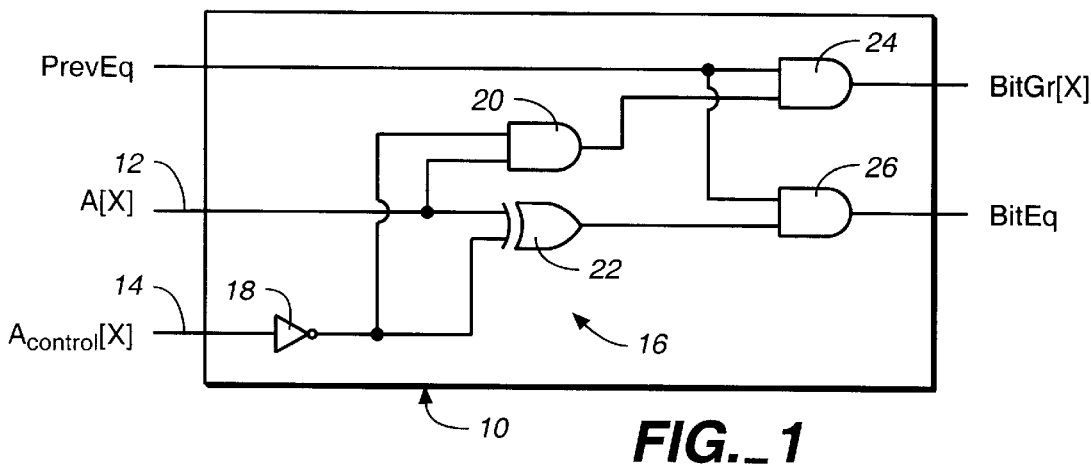
FIG._1
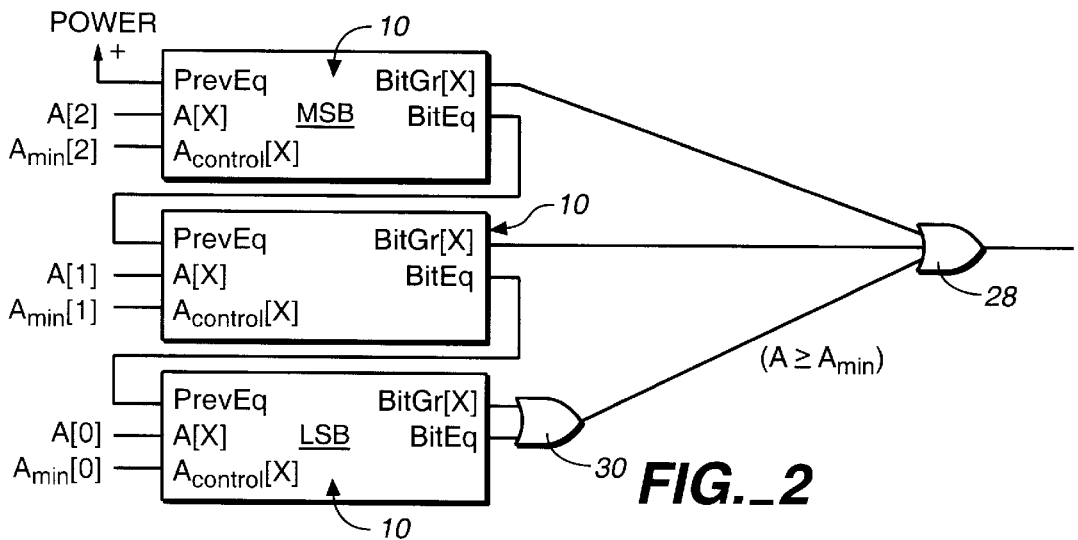
FIG._2
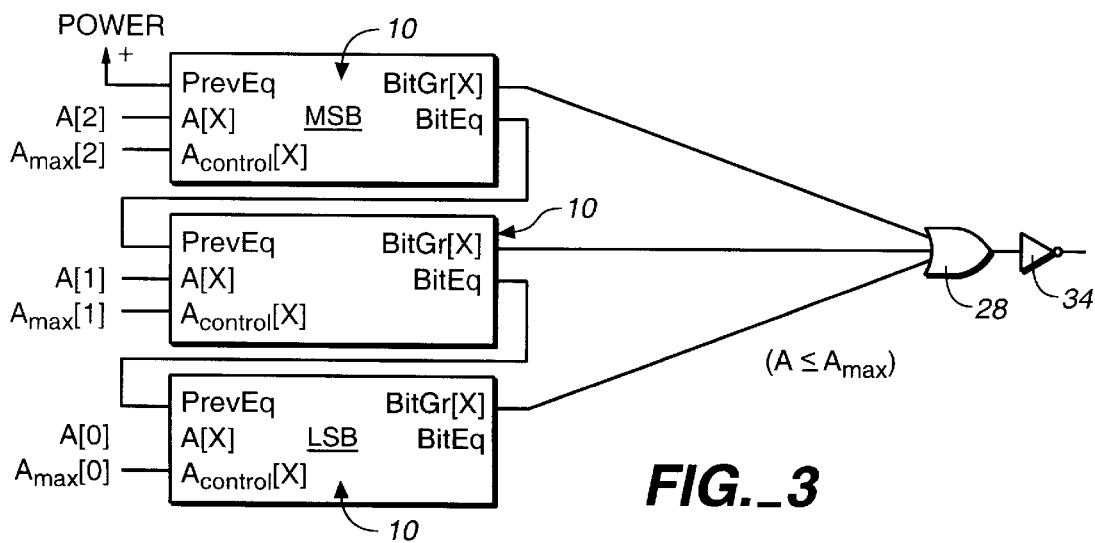
FIG._3

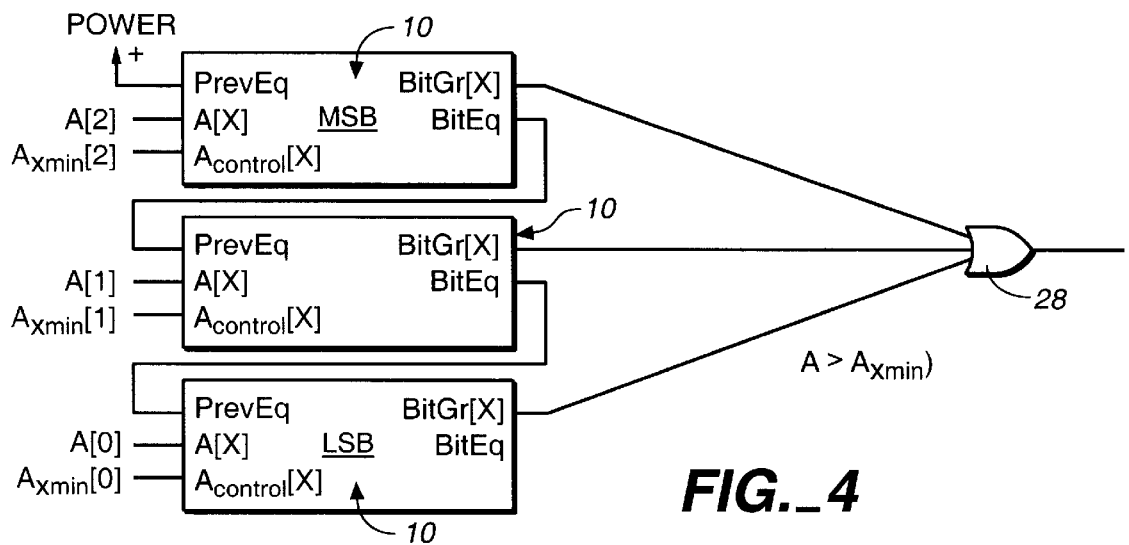
FIG._4
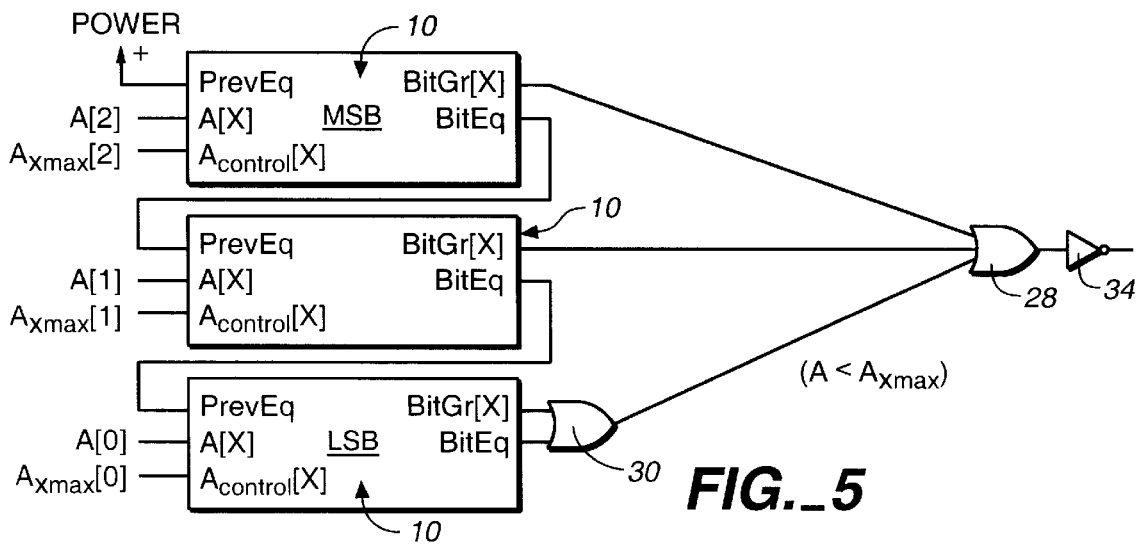
FIG._5

COMBINATIONAL LOGIC FOR COMPARING N-BIT WIDE BUSES

BACKGROUND OF THE INVENTION

Certain types of memories, such as SRAM, DPR, etc., allow an acceptable address range to be set by specifying a minimum and maximum address values, thereby defining the acceptable address range. In this case, generally the address bus will continue to allow address values which are outside the acceptable address range which has been specified. Therefore, the memory devices themselves may include a mechanism to determine whether or not a given address is valid with respect to the set range. Typically, this is done using behavioral code (i.e. performing a simple <or> operation). However, there are certain applications where the modeling must be done using combinational logic.

OBJECTS AND SUMMARY

It is an object of the present invention to provide a combinational logic circuit which tests whether a given memory address is within a particular range.

It is a further object of the present invention to provide block based modular combinational logic circuits which test whether a given memory address is acceptable.

Briefly, and in accordance with at least one of the foregoing objects, the present invention provides a combinational logic circuit for determining whether an address bit is inside or outside a range at least partially defined by a control address bus. The combinational logic circuit connects to an address bit line (from the address bus being tested) and connects to a control address bit line (from the control address bus that at least partially defines the range). The combinational logic is configured to produce a signal indicating whether the address bit being tested and the control address bit at least partially defining the range are equal. The combinational logic is also configured to produce a signal representing a mathematical relation between the address bit being tested and the control address bit at least partially defining the range. The mathematical relation identifies whether the address bit being tested is inside or outside the range at least partially defined by the control address bit.

Desirably, a series of combinational logic circuits is provided for determining whether bits of an address are inside or outside of range. In an exemplary case, each logic circuit in the series includes a first input line for receiving a signal, a second input line for receiving a bit of the address being tested, a third input line for receiving a value at least partially defining the range, a first output line for carrying a signal indicating whether the bit being tested and the value at least partially defining the range are equal, and a second output line for carrying a signal indicating a mathematical relation between the bit being tested and the value at least partially defining the range, where the mathematical relation identifies whether the bit being tested is inside or outside the range. The combinational logic is connected to the input and output lines, and is configured to receive the signals carried by the input lines and to produce the signals carried by the output lines.

Preferably, a first logic circuit in the series is connected to a power source at the first input line, and the first input lines of each of the other logic circuits are connected to the second output of a previous logic circuit in the series. The first input lines of each of the other logic circuits carry a signal indicating whether all previous bits of the address have been determined by previous logic circuits in the series to be equal to the values carried by the third input lines of the previous logic circuits. The first output line of each of the logic circuits in the series carry a signal indicating whether the bit being tested by that logic circuit and the value carried by the third input line of that logic circuit are equal and indicate whether all previous bits of the address have been determined by previous logic circuits in the series to be equal to the values carried by the third input lines of the previous logic circuits. This circuit can be connected logically in series such that any size of address may be tested.

By providing a combinational logic circuit or series thereof in accordance with the present invention, one or more address bits can be tested with respect to an acceptable range.

BRIEF DESCRIPTION OF THE DRAWINGS

The present invention and the advantages thereof will become more apparent upon consideration of the following detailed description when taken in conjunction with the accompanying drawings of which:

FIG. 1 is a schematic view of a combinational logic circuit which is in accordance with an embodiment of the present invention;

FIG. 2 is a schematic view of a series of combinational logic circuits, where the series is in accordance with an embodiment of the present invention (testing whether $A \geq A_{min}$);

FIG. 3 is a schematic view of a series of combinational logic circuits similar to that of FIG. 2, but in an alternative configuration (testing whether $A \leq A_{max}$);

FIG. 4 is a schematic view of a series of combinational logic circuits similar to that of FIG. 2, but in an alternative configuration (testing whether $A > A_{xmin}$); and FIG. 5 is a schematic view of a series of combinational logic circuits similar to that of FIG. 2, but in an alternative configuration (testing whether $A < A_{xmax}$).

DESCRIPTION

FIG. 1 illustrates a combinational logic circuit 10 which is in accordance with an embodiment of the present invention, and which can be employed to determine whether a given address bit is within an acceptable, pre-set range. The combinational logic circuit 10 is connected to an address bit line 12 as well as to a control address bit line 14. Specifically, input line "A[X]" of the combinational logic circuit is connected to the address bit line 12 for receiving an address bit which is to be tested by the combinational logic circuit 10, and input line "$A_{control}$[X]" of the combinational logic circuit 10 is connected to the control address bit line 14 for receiving a control address bit which at least partially defines the acceptable, pre-set range. The control address bit is preferably a value at the end of the range, such as a minimum or maximum address bit valve.

Another input line (identified as "PrevEq") of the combination logic circuit may be connected to a power source, or to another combination logic circuit within a series of combinational logic circuits, as will be discussed more fully later herein, for testing an address consisting of a plurality of address bits.

The combinational logic circuit 10 includes combinational logic 16 which is configured to output information relating to whether the address bit being tested by the combinational logic circuit 10 (the value received by input A[X]) is inside or outside of the range at least partially defined by the control address bit received by the combinational logic circuit 10 (the value received by input $A_{control}$ [X]).

Specifically, the configuration of the combination logic 16 preferably provides that an output line "BitGr [X]" of the combination logic circuit 10 carries a signal which identifies a mathematical relationship between the address bit being tested and the control address bit received by the combinational logic 16, such as whether the address bit (received by input line A[X]) is greater than the control address bit (received by input line $A_{control}$[X]). Additionally, as mentioned and as will be described more fully later herein, preferably the combinational logic circuit 10 is provided within a series of combinational logic circuits, and the combinational logic 16 is configured such that the output line BitGr [X] will only assert itself when all previous address bits (received by previous combinational logic circuits in the series) have been found to be equal (by the previous combinational logic circuits) and the address bit tested by that particular combinational logic circuit has been found to be greater than the particular control address bit received.

The configuration of the combinational logic 16 also preferably provides that an output line, "BitEq", of the combinational logic circuit 10 carries a signal which identifies whether or not the address bit (received by input line A[X]) has been found to be equal to the control address bit (received by input line $A_{control}$ [X]). As mentioned, and as will be described more fully later herein, preferably the combinational logic circuit 10 is provided within a series of combinational logic circuits. Preferably the combinational logic 16 is configured such that the output line BitEq will only assert itself when all previous address bits (received by previous combinational logic circuits in the series) have been found to be equal (by previous combinational logic circuits) and the address bit tested by that particular combinational logic circuit 10 has been found to be equal to the control address bit which has been received by that particular combinational logic circuit 10.

As illustrated in FIG. 1, the combinational logic 16 of the combinational logic circuit preferably provides AND logic, XOR logic and inverting means. Specifically, an invertor gate 18 is preferably connected to input line $A_{control}$[X] for inverting the control address bit which is received by the combinational logic circuit 10 over the control address bit line 14. The output of the invertor gate 18 is connected both to an AND gate 20 and to an XOR gate 22. Both the AND gate 20 and the XOR gate 22 are also connected to input line A[X] for receiving the address bit received by the combinational logic circuit 10 over the address bit line 12.

The output of the AND gate 20 carries a signal which indicates whether or not the address bit received by the combinational logic circuit 10 is greater than the control address bit received by the combinational logic circuit 10. Specifically, the output of the AND gate 20 will be 1 if the address bit (received by input line A[X]) is greater than the address control bit (received by input line $A_{control}$[X]), and the output of the AND gate 20 will be 0 if the address bit is less than or equal to the address control bit. The output of the XOR gate 22 carries a signal which indicates whether or not the address bit is equal to the control address bit.

The output of the AND gate 20 is connected to the input of a second AND gate 24, and the output of the XOR gate 22 is connected to the input of a third AND gate 26. Both the second and third AND gates 24 and 26, respectively, are connected to input line PrevEq, which, as mentioned, if the combinational logic circuit 10 is provided in a series of combinational logic circuits, preferably carries a signal indicating whether all previous address bits have been found by previous combinational logic circuits to be equal to corresponding control address bits. On the other hand, should the combinational logic circuit 10 be provided not within a series, or, as will be described, the combinational logic circuit 10 is the first combinational logic circuit in a series, the input line PrevEq of the combinational logic circuit 10 preferably will be connected to a power source (this is depicted in FIGS. 2–5, and will be discussed in more detail later herein).

Therefore, the output of the second AND gate 24, which is, effectively, output line BitGr [X] of the combinational logic circuit 10, will only assert itself when all previous address bits (received by previous combinational logic circuits in the series) have been found to be equal (by the previous combinational logic circuits) and the address bit tested by the combinational logic circuit 10 has been found to be greater than the control address bit received by the combinational logic circuit 10. Also, the output of the third AND gate 26, which is output line BitEq of the combinational logic circuit 10, carries a signal which identifies whether or not the address bit has been found to be equal to the control address bit, and will only assert itself when all previous address bits (received by previous combinational logic circuits in the series) have been found to be equal (by the previous combinational logic circuits) and the address bit tested by the combinational logic circuit 10 has been found to be equal to the control address bit which has been received by the combinational logic circuit 10.

As mentioned, the combinational logic circuit 10 is preferably provided within a series of combinational logic circuits to provide that the series can test an address bus, and this will be described more fully later herein. However, the combinational logic circuit 10 illustrated in FIG. 1 can also be utilized not within in a series, or in isolation, to test a single address bit. In this case, the input line PrevEq would be connected to a power source, and the outputs BitGr [X] and BitEq would carry signals indicating whether the address bit (carried by input line A[X]) is greater than the control address bit (carried by input line $A_{control}$[X]), and whether the address bit (carried by input line A[X]) is equal to the control address bit (carried by input line $A_{control}$[X]), respectively.

The implementation of the combinational logic circuit 10 illustrated in FIG. 1 within a series of combinational logic circuits to test an address will now be described with reference to FIG. 2. Preferably a plurality of combinational logic circuits 10 are connected in series, where the structure of each of the combinational logic circuits 10 in the series is the same as is depicted in FIG. 1. In FIG. 2, each combinational logic circuit 10 is indicated as a simplified "box" with inputs PrevEq, A[X] and $A_{control}$[X], and outputs BitGr [X] and BitEq [X], with the understanding that each combinational logic circuit 10 within the series has a structure identical to the combinational logic circuit 10 which is depicted in FIG. 1, and which has already been described hereinabove.

The series of combinational logic circuits 10 illustrated in FIG. 2 tests whether or not an address is within an acceptable range. Specifically, each combinational logic circuit 10 in the series tests a bit of the address. As illustrated in FIG. 2, the input line A[X] of each combinational logic circuit 10 in the series is connected to an address bit line, i.e. A(0), A(1) ... A(N−1), where N is the number of bits in the address and is also the number of combinational logic circuits 10 in the series. The series of combinational logic circuits 10 depicted in FIG. 2 (and FIGS. 3–5, as will be described) is configured for testing a three bit address; therefore, three combinational logic circuits 10 are provided in the series. However, other configurations can be used to test larger or smaller addresses merely by providing more or less combinational logic circuits 10 in the series. In FIG. 2 (and FIGS. 3–5, as will be described), the uppermost combinational logic circuit tests the most significant bit (MSB) of the address, and the lowermost combinational logic circuit tests the least significant bit (LSB) of the address.

The input line $A_{control}[X]$ of each combinational logic circuit 10 in the series is connected to a control address bit line, i.e. $A_{control}(0), A_{control}(1) \ldots A_{control}(N-1)$. In FIG. 2, it is assumed that each of the control address bits received by the combinational logic circuits is the minimum address bit value which is within the acceptable address bit range for the particular address bit which is to be tested by the combinational logic circuit. Therefore, the control address bits are designated $A_{min}[0]$, $A_{min}[1]$ and $A_{min}[2]$. The series of combinational circuits illustarted in FIG. 2 therefore tests to see if $A \geq A_{min}$.

Of course, the control address bits received by the inputs $A_{control}[X]$ of the combinational logic circuits 10 in the series may be the maximum address bit values which are within acceptable address bit ranges. Alternatively, the control address bits received by the inputs $A_{control}[X]$ of the combinational logic circuits 10 in the series may be slightly outside of the acceptable address bit ranges. Should the control address bits received by the inputs $A_{control}[X]$ of the combinational logic circuits 10 in the series be the maximum address bit values, or be slightly outside the acceptable address bit ranges, certain relatively minor modifications will need to be made to that which is depicted in FIG. 2. These modifications are effectively illustrated in FIGS. 3–5, and will be described more fully later herein.

Regardless, preferably the input line PrevEq of the first combinational logic circuit 10 in the series (corresponding to the MSB) is connected to a power source, and the input line PrevEq of each subsequent combinational logic circuit in the series is connected to the output line BitEq of each preceding combinational logic circuit. The output line BitGr [X] of each combinational logic circuit 10, except for the last combinational logic circuit in the series (corresponding to the LSB) is connected to an OR gate 28. Both of the output lines, BitGr [X] and BitEq, of the last combinational logic circuit in the series (corresponding to the LSB) is connected to an intermediate OR gate 30 which has an output connected to OR gate 28. The output of the OR gate 28 carries a signal which identifies whether the address value is valid, or is within the acceptable range, as at least partially defmed by the control address bit values which have been received by the combinational logic circuits in the series.

As mentioned with reference to FIG. 1, when the combinational logic circuits 10 are connected in series as illustrated in FIG. 2, the input line PrevEq of each combinational logic circuit 10 in the series, except for the first circuit in the series (corresponding to the MSB), carries a signal indicating whether all previous address bits have been found by previous combinational logic circuits to be equal to corresponding control address bits. Additionally, the output line BitGr [X] of each combinational logic circuit 10 will only assert itself when all previous address bits (received by previous combinational logic circuits in the series) have been found to be equal and the address bit tested by that particular combinational logic circuit has been found to be greater than the particular control address bit received. Furthermore, the output line BitEq of each combinational logic circuit 10 in the series will only assert itself when all previous address bits (received by previous combinational logic circuits in the series) have been found to be equal and the address bit tested by that particular combinational logic circuit has been found to be equal to the control address bit which has been received by that particular combinational logic circuit. Hence, the output of the OR gate 28 in the configuration illustrated in FIG. 2 carries a signal which identifies whether the address is valid, or is within the acceptable range, as partially defined by the control address bits received by the combinational logic circuits 10 in the series.

As mentioned, it is possible to provide that the control address bits, $A_{control}(0), A_{control}(1) \ldots A_{control}(N-1)$, received by the series of combinational logic circuits are the maximum address bit values rather than the minimum address bit values. In this case, the configuration illustrated in FIG. 3 can be employed, wherein OR gate 30 illustrated in FIG. 2 has been removed, and the output line BitGr [X] of the last combinational logic circuit 10 in the series (corresponding to the LSB) is connected directly to the OR gate 28 along with the output lines BitGr [X] of the other combinational logic circuits in the series. Additionally, the output of the OR gate 28 is connected to inverting means 34. The inverted output of the OR gate 28 is a signal which effectively indicates whether or not the address is within the acceptable range as partially defined by the maximum control address bits which have been received by the combinational logic circuits 10 in the series. Because the control address bit values are the maximum address bit values, the control address bits are designated $A_{max}[0]$, $A_{max}[1]$ and $A_{max}[2]$ in FIG. 3. The series of combinational circuits illustarted in FIG. 3 therefore tests to see if $A \leq A_{max}$.

As mentioned, it is also possible to provide that the control address bits, $A_{control}(0), A_{control}(1) \ldots A_{control}(N-1)$, received by the series of combinational logic circuits are slightly outside of the range of acceptable address bit values. In the case where the control address bits are provided as being immediately outside of the acceptable range, or the first unacceptable address ($A_{min}-1$), the configuration illustrated in FIG. 4 can be employed, wherein OR gate 30 illustrated in FIG. 1 has been removed, and the output line BitGr [X] of the last combinational logic circuit in the series (corresponding to the LSB) is connected directly to the OR gate 28 along with the output lines BitGr [X] of the other combinational logic circuits in the series. The output of the OR gate 28 is a signal which effectively indicates whether or not the address is within the acceptable range as partially defined by the control address bits which have been received by the combinational logic circuits 10 in the series. Because the control address bit values are immediately outside of the acceptable range, the control address bits are designated $A_{xmin}[0]$, $A_{xmin}[1]$ and $A_{xmin}[2]$ in FIG. 4. The series of combinational circuits illustarted in FIG. 4 therefore tests to see if $A > A_{xmin}$.

It is also possible to provide that the control address bits, $A_{control}(0), A_{control}(1) \ldots A_{control}(N-1)$, are provided as being immediately outside of the acceptable range. In this case, the configuration illustrated in FIG. 5 can be employed. The configuration illustrated in FIG. 5 is identical to that of FIG. 2, except the output of the OR gate 28 is connected to inverting means 34. The inverted output of the OR gate 28 is a signal which effectively indicates whether or not the address is within the acceptable range as partially defined by the control address bits which have been received by the combinational logic circuits 10 in the series. Because the control address bit values are immediately outside the acceptable range, the control address bits are designated $A_{xmax}[0]$, $A_{xmax}[1]$ and $A_{xmax}[2]$ in FIG. 5. The series of combinational circuits illustarted in FIG. 5 therefore tests to see if $A > A_{xmax}$.

With regard to each of the configurations shown in FIGS. 2–4, should one not wish to implement a modular design, there are ways to reduce the number of logic gates needed (particularly with respect to the combinational logic circuits corresponding to the MSB and LSB of the address), as one having ordinary skill in the art would recognize. In addition, if multiple input AND and OR gates are utilized, then it would be possible to effectively collapse the Eq tree so that fewer AND gates are used. Still other modifications would be readily apparent to one having ordinary skill in the art.

A single combinational logic circuit (see FIG. 1) which is in accordance with an embodiment of the present invention provides that combinational logic can be used to test whether an address bit is within an acceptable range, where the range is at least partially defined by a control address bit received by the combinational logic circuit.

Furthermore, a plurality of combinational logic circuits which are arranged in a series (see FIGS. 2–5) in accordance with the present invention provides that combinational logic can be used to test whether an address (comprising a plurality of address bits) is within an acceptable range, where the range is at least partially defined by control address bits received by the combinational logic circuits in the series.

While embodiments of the present invention are shown and described, it is envisioned that those skilled in the art may devise various modifications of the present invention without departing from the spirit and scope of the appended claims.

What is claimed is:

1. A combinational logic circuit for determining whether an address bit is inside or outside a range at least partially defined by a control address bit, said logic circuit comprising: combinational logic connected to an address bit line for receiving the address bit being tested and connected to a control address bit line for receiving the control address bit at least partially defining the range, said combinational logic configured to produce a signal indicating whether the address bit being tested and the control address bit at least partially defining the range are equal, and said combinational logic configured to produce a signal representing a mathematical relation between the address bit being tested and the control address bit at least partially defining the range, said mathematical relation identifying whether the address bit being tested is inside or outside the range at least partially defined by the control address bit, wherein said combinational logic which is connected to the address bit line and the control address bit line includes inverting means connected to the control address bit line for inverting the control address bit which at least partially defines the range and is carried by the control address bit line, and includes AND logic connected to the address bit line and said inverting means, said combinational logic comparing the inverted control address bit output by said inverting means and the address bit carried by said address bit line and outputting the signal indicating whether the address bit being tested is greater than or less than the inverted control address bit.

2. A combinational logic circuit for determining whether an address bit is inside or outside a range at least partially defined by a control address bit, said logic circuit comprising: combinational logic connected to an address bit line for receiving the address bit being tested and connected to a control address bit line for receiving the control address bit at least partially defining the range, said combinational logic configured to produce a signal indicating whether the address bit being tested and the control address bit at least partially defining the range are equal, and said combinational logic configured to produce a signal representing a mathematical relation between the address bit being tested and the control address bit at least partially defining the range, said mathematical relation identifying whether the address bit being tested is inside or outside the range at least partially defined by the control address bit, wherein said combinational logic which is connected to the address bit line and the control address bit line includes inverting means connected to the control address bit line for inverting the control address bit which at least partially defines the range and is carried by the control address bit line, and XOR logic connected to the address bit line and said inverting means, said XOR logic comparing the inverted address control bit which is output by said inverting means and the address bit carried by the address bit line and outputting the signal indicating whether the inverted control address bit output by said inverting means and the address bit carried by the address bit line are equal.

3. The combinational logic circuit of claim 2, wherein said combinational logic which is connected to the address bit line and the control address bit line includes AND logic connected to an output of said XOR logic.

4. A combinational logic circuit for determining whether an address bit is inside or outside a range at least partially defined by a control address bit, said logic circuit comprising: combinational logic connected to an address bit line for receiving the address bit being tested and connected to a control address bit line for receiving the control address bit at least partially defining the range, said combinational logic configured to produce a signal indicating whether the address bit being tested and the control address bit at least partially defining the range are equal, and said combinational logic configured to produce a signal representing a mathematical relation between the address bit being tested and the control address bit at least partially defining the range, said mathematical relation identifying whether the address bit being tested is inside or outside the range at least partially defined by the control address bit, wherein said combinational logic which is connected to the address bit line and the control address bit line includes inverting means connected to the control address bit line for inverting the control address bit which at least partially defines the range and is carried by the control address bit line, AND logic connected to the address bit line and said inverting means, said combinational logic comparing the inverted control address bit output by said inverting means and the address bit carried by said address bit line and outputting a signal indicating whether the address bit being tested is greater than or less than the inverted control address bit, and XOR logic connected to the address bit line and said inverting means, said XOR logic comparing the inverted control address bit which is output by said inverting means and the address bit which is carried by address bit line and outputting a signal indicating whether the inverted control address bit output by said inverting means and the address bit carried by the address bit line are equal.

5. A combinational logic circuit for determining whether an address bit is inside or outside a range at least partially defined by a control address bit, said logic circuit comprising: combinational logic connected to an address bit line for receiving the address bit being tested and connected to a control address bit line for receiving the control address bit at least partially defining the range, said combinational logic configured to produce a signal indicating whether the address bit being tested and the control address bit at least partially defining the range are equal, and said combinational logic configured to produce a signal representing a mathematical relation between the address bit being tested and the control address bit at least partially defining the range, said mathematical relation identifying whether the address bit being tested is inside or outside the range at least partially defined by the control address bit, wherein said combinational logic circuit is connected to another combinational logic circuit and receives a signal therefrom indicating whether all previous address bits have been determined by other logic circuits to be equal to corresponding control address bits, and wherein said combinational logic circuit is configured to produce a signal indicating whether the address bit being tested and the control address bit at least partially defining the range are equal and indicating whether all previous address bits have been determined by other logic circuits to be within a range defined by corresponding control address bits, wherein said combinational logic which is connected to the address bit line and the control address bit line includes inverting means connected to the control address bit line for inverting the control address bit which at least partially defines the range and is carried by the control address bit line, XOR logic connected to the address bit line and said inverting means, said XOR logic comparing the inverted address control bit output by said inverting means and the address bit carried by address bit line and outputting a signal indicating whether the inverted control address bit output by said inverting means and the address bit carried by the address bit line are equal, AND logic connected to an output of said XOR logic and to said another combinational logic circuit from which is received the signal indicating whether all previous address bits have been determined by other logic circuits to be equal to corresponding control address bits, said AND logic outputting a signal indicating whether the address bit being tested has been determined to be equal to the control address bit carried by the control address bit line and whether all previous address bits have been determined by other logic circuits to be equal to corresponding control address bits.

6. The combinational logic circuit of claim 5, wherein said combinational logic which is connected to the address bit line and the control address bit line includes AND logic connected to the address bit line and said inverting means, said combinational logic comparing the inverted control address bit output by said inverting means and the address bit carried by said address bit line and outputting a signal indicating whether the address bit being tested is greater than or less than the inverted control address bit.

7. A combinational logic circuit for determining whether an address bit is inside or outside a range at least partially defined by a control address bit, said logic circuit comprising: combinational logic connected to an address bit line for receiving the address bit being tested and connected to a control address bit line for receiving the control address bit at least partially defining the range, said combinational logic configured to produce a signal indicating whether the address bit being tested and the control address bit at least partially defining the range are equal, and said combinational logic configured to produce a signal representing a mathematical relation between the address bit being tested and the control address bit at least partially defining the range, said mathematical relation identifying whether the address bit being tested is inside or outside the range at least partially defined by the control address bit, wherein said combinational logic which is connected to the address bit line and the control address bit line includes inverting means connected to the control address bit line for inverting the control address bit which at least partially defines the range and is carried by the control address bit line, and includes AND logic connected to the address bit line and said inverting means, said combinational logic comparing the inverted control address bit output by said inverting means and the address bit carried by said address bit line and outputting a signal indicating whether the address bit being tested is greater than or less than the inverted control address bit.

8. The combinational logic circuit of claim 7, wherein said combinational logic circuit is connected to another combinational logic circuit and receives a signal therefrom indicating whether all previous address bits have been determined by other logic circuits to be equal to corresponding control address bits, wherein said combinational logic which is connected to the address bit line and the control address bit line includes additional AND logic connected to said AND logic which is connected to the address bit line and said inverting means, said additional AND logic comparing the signal indicating whether the address bit being tested is greater than or less than the inverted control address bit and the signal received from said another combinational logic circuit indicating whether all previous address bits have been determined by other logic circuits to be equal to corresponding control address bits, said additional AND logic outputting a signal which indicates whether the address bit being tested and the control address bit which at least partially defines the range are equal and indicates whether all previous address bits have been determined by other logic circuits to be within a range defined by corresponding control address bits.

9. The combinational logic circuit of claim 7, wherein said combinational logic which is connected to the address bit line and the control address bit line includes XOR logic connected to the address bit line and said inverting means, said XOR logic comparing the inverted address control bit which is output by said inverting means and the address bit carried by the address bit line and outputting the signal indicating whether the inverted control address bit output by said inverting means and the address bit carried by the address bit line are equal.

10. The combinational logic circuit of claim 9, wherein said combinational logic circuit is connected to another combinational logic circuit and receives a signal therefrom indicating whether all previous address bits have been determined by other logic circuits to be equal to corresponding control address bits, wherein said combinational logic which is connected to the address bit line and the control address bit line includes additional AND logic connected to said AND logic which is connected to the address bit line and said inverting means, said additional AND logic comparing the signal indicating whether the address bit being tested is greater than or less than the inverted control address bit and the signal received from said another combinational logic circuit indicating whether all previous address bits have been determined by other logic circuits to be equal to corresponding control address bits, said additional AND logic outputting a signal which indicates whether the address bit being tested and the control address bit which at least partially defines the range are equal and indicates whether all previous address bits have been determined by other logic circuits to be within a range defined by corresponding control address bits.

11. A series of combinational logic circuits connected together for determining whether bits of an address are inside or outside a range, said series of combinational logic circuits comprising: a plurality of combinational logic circuits, each including a first input line for receiving a signal, a second input line for receiving a bit of said address being tested, a third input line for receiving a value at least partially defining the range, a first output line for carrying a signal indicating whether the bit being tested and the value at least partially defining the range are equal, a second output line for carrying a signal indicating a mathematical relation between the bit being tested and the value at least partially defining the range, said mathematical relation identifying whether the bit being tested is inside or outside the range, and combinational logic connected to said input lines and said output lines, said combinational logic configured to receive said signals carried by the input lines and configured to produce the signals carried by the output lines, wherein a first logic circuit in said series is connected to a power source at said first input line, and wherein the first input lines of each of the other logic circuits are connected to the second output of a previous logic circuit in said series, said first input lines of each of the other logic circuits carrying a signal indicating whether all previous bits of said address have been determined by previous logic circuits in said series to be equal to the values carried by the third input lines of said previous logic circuits, said first output line of each of said logic circuits in said series carrying a signal indicating whether the bit being tested by that logic circuit and the value carried by the third input line of that logic circuit are equal and indicating whether all previous bits of said address have been determined by previous logic circuits in said series to be equal to the values carried by the third input lines of the previous logic circuits.

* * * * *